(12) United States Patent
Belpaire et al.

(10) Patent No.: US 9,744,701 B2
(45) Date of Patent: Aug. 29, 2017

(54) BAFFLE OR REINFORCER WITH FIXATION MECHANISM

(75) Inventors: Vincent Belpaire, Uccle (BE); Jean Mendibour, Barr (FR)

(73) Assignee: SIKA TECHNOLOGY AG, Baar (CH)

( * ) Notice: Subject to any disclaimer, the term of this patent is extended or adjusted under 35 U.S.C. 154(b) by 649 days.

(21) Appl. No.: 13/578,372

(22) PCT Filed: Feb. 3, 2011

(86) PCT No.: PCT/EP2011/051605
§ 371 (c)(1),
(2), (4) Date: Oct. 17, 2012

(87) PCT Pub. No.: WO2011/098395
PCT Pub. Date: Aug. 18, 2011

(65) Prior Publication Data
US 2013/0037152 A1    Feb. 14, 2013

(51) Int. Cl.
*B29C 44/12* (2006.01)
*B29C 44/18* (2006.01)
(Continued)

(52) U.S. Cl.
CPC .......... *B29C 44/188* (2013.01); *B29C 44/581* (2013.01); *B62D 29/002* (2013.01);
(Continued)

(58) Field of Classification Search
CPC ................. B29C 44/188; B29C 44/581; Y10T 428/24273; Y10T 428/24008; B62D 29/002
(Continued)

(56) References Cited

U.S. PATENT DOCUMENTS

| 4,240,999 A * | 12/1980 | Decker, Jr. ............ B29C 44/383 249/107 |
| 5,085,568 A * | 2/1992 | Turgeon .............. B29C 33/0077 249/91 |

(Continued)

FOREIGN PATENT DOCUMENTS

| DE | 19505937 A1 * | 8/1996 | ........... B29C 44/581 |
| EP | 1543936 A2 | 6/2005 | |

(Continued)

OTHER PUBLICATIONS

Wirtten Opinion of the International Searching Authority for PCT/EP2011/051605, dated Apr. 26, 2011.
(Continued)

*Primary Examiner* — Seyed Masoud Malekzadeh
(74) *Attorney, Agent, or Firm* — Buchanan Ingersoll & Rooney PC (57) ABSTRACT

A baffle or reinforcer includes a carrier configured to be disposed in a cavity and a fixation mechanism disposed on the carrier and configured to at least partially support the carrier in the cavity. The fixation mechanism defines an opening for receiving an expandable material. The fixation mechanism has an anti-return device configured to prevent at least a portion of the expandable material from escaping through the opening during expansion. A method includes inserting the carrier into the cavity, injecting the expandable material into the cavity via the opening in the fixation mechanism, expanding the expandable material within the cavity, and preventing at least a portion of the expandable material from escaping through the opening during expansion.

16 Claims, 7 Drawing Sheets

(51) Int. Cl.
    *B29C 44/58* (2006.01)
    *B62D 29/00* (2006.01)
(52) U.S. Cl.
    CPC .................. *Y10T 428/24008* (2015.01); *Y10T 428/24273* (2015.01)
(58) Field of Classification Search
    USPC .... 425/4 R, 129.1, 557, 562, 564, 566, 568, 425/569, 571, 500, 501; 249/91, 96, 97
    See application file for complete search history.

(56) References Cited

U.S. PATENT DOCUMENTS

| | | | | |
|---|---|---|---|---|
| 5,098,267 A | * | 3/1992 | Cheng | B29B 7/7414 264/50 |
| 5,106,283 A | * | 4/1992 | Sauer | B29C 45/1735 264/328.8 |
| 5,380,186 A | * | 1/1995 | Hettinga | B29C 45/586 425/557 |
| 5,670,179 A | * | 9/1997 | Alper | B29C 44/581 425/4 R |
| 5,931,474 A | * | 8/1999 | Chang | B29C 44/0461 277/316 |
| 6,321,793 B1 | | 11/2001 | Czaplicki et al. | |
| 6,413,611 B1 | * | 7/2002 | Roberts | B62D 29/002 296/193.06 |
| 2004/0217498 A1 | | 11/2004 | Ondrus et al. | |

FOREIGN PATENT DOCUMENTS

| | | | | |
|---|---|---|---|---|
| FR | 2928578 A1 | * | 9/2009 | ........... B29C 44/383 |
| FR | 2928578 A1 | | 9/2009 | |
| IT | EP 1543936 A2 | * | 6/2005 | ........... B29C 44/581 |
| JP | 09099440 A | * | 4/1997 | ........... B29C 44/383 |
| KR | 20040046810 A | | 6/2004 | |

OTHER PUBLICATIONS

European Office Action issued Jun. 3, 2016 in corresponding European Patent Application No. 11701693.1.

* cited by examiner

BAFFLE OR REINFORCER WITH FIXATION MECHANISM

CROSS-REFERENCE TO RELATED APPLICATIONS

This application claims priority to EP application number 10153264.6 filed on Feb. 11, 2010 and International Application No. PCT/EP2011/051605 filed on Feb. 3, 2011, the entirety of which are hereby incorporated by reference.

BACKGROUND

A baffle or reinforcer includes a carrier and one or more thermally expandable materials designed for positioning in cavities of, for instance, automotive or aerospace beans, pillars, rails, doors, etc. to provide acoustic dampening, sealing, and/or structural reinforcement. The carrier is generally formed from plastic or metal surrounded with the expandable material. When inserted into the cavity and by the action of the heat applied in electrophoresis baking, the baffle material expands to seal the cavity and or bond the carrier to the member. Alternatively, a foamable bulk material is injected in the cavity after painting and fills the cavity as it expands.

When using this alternative process, the bulk material generally expands in a large sections were no trim holes can be placed without being filled with excessive amounts of the foamable material. Further, the bulk material is not self supported and flows in large sections with incomplete sealing. Previous attempts to contain the bulk material have been unsuccessful. Accordingly, a new baffle is needed that correctly seals the cavity, prevents foam contamination of trim holes in the proximity of the section to be sealed, and/or prevents significant amounts of foam from escaping from the introduction hole.

SUMMARY

A baffle or reinforcer includes a carrier configured to be disposed in a cavity. A fixation mechanism is disposed on the carrier and is configured to at least partially support the carrier in the cavity. The fixation mechanism defines an opening for receiving an expandable material and includes an anti-return device that is configured to prevent at least a portion of the expandable material from escaping through the opening during expansion. Advantageously a rigid carrier is used.

A method includes inserting a carrier into a cavity, the carrier having a fixation mechanism defining an opening and having an anti-return device. The method further includes injecting an expandable material onto the carrier via the opening in the fixation mechanism, expanding the expandable material, and preventing at least a portion of the expandable material from escaping through the opening during expansion using an anti-return device. Advantageously a rigid carrier is used.

DETAILED DESCRIPTION

An exemplary baffle or reinforcer includes a carrier configured to be disposed in a cavity and a fixation mechanism disposed on the carrier and configured to at least partially support the carrier in the cavity. Preferably the baffle or reinforcer includes a rigid, substantially flat carrier configured to be disposed in a cavity, substantially normal to the main axis of the cavity. The fixation mechanism is preferably adapted to fit into a fixation hole on one side of the cavity. The fixation mechanism defines an opening for receiving an expandable material and includes an anti-return device that prevents a portion of the expandable material from escaping through the opening during expansion. This has the advantage that there is no need for two separate holes for the fixation of the support and the filling of the expandable material. The baffle or reinforcer described below may be used to correctly seal cavities, prevent foam contamination of trim holes in the proximity of the section to be sealed, and/or prevent significant amounts of foam from escaping from the introduction hole.

Figure 1:
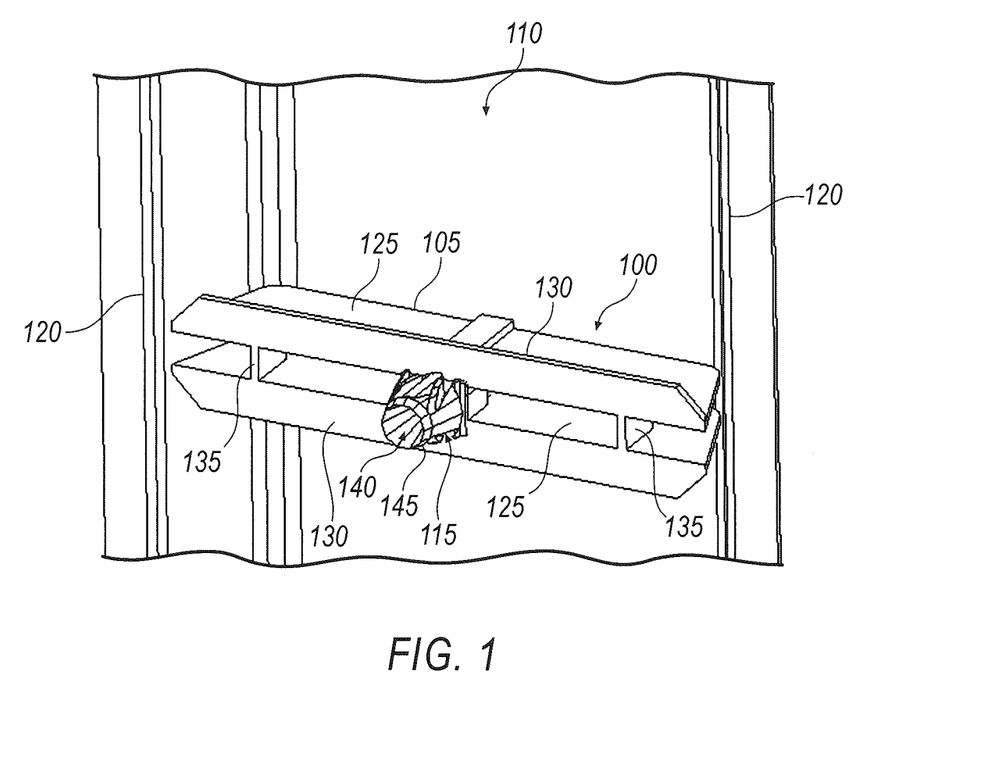
FIG. 1 illustrates a front perspective view of an exemplary baffle or reinforcer having a fixation mechanism disposed on a carrier and wherein the baffle or reinforcer is disposed in a cavity.

FIG. 1 illustrates an exemplary baffle or reinforcer 100 having a carrier 105 disposed in a cavity 110 and a fixation mechanism 115 disposed on the carrier 105 and configured to at least partially support the carrier 105 in the cavity 110. The baffle or reinforcer 100 may take many different forms and include multiple and/or alternate components and facilities. While an exemplary baffle or reinforcer 100 is shown in FIG. 1, the exemplary components illustrated in Figure are not intended to be limiting. Indeed, additional or alternative components and/or implementations may be used.

The baffle or reinforcer 100 may be formed from any material and have a shape that generally conforms to the shape of the cavity 110. The baffle or reinforcer 100 may be disposed within a cavity 110 defined by two or more walls 120. For instance, the cavity 110 may be a hollow construction defined by a vehicle pillar. The cavity 110 may have various cross-sectional shapes, and the baffle or reinforcer 100 may have a shape that generally conforms to the cross-sectional shape of the cavity 110. Advantageously the cavity may have a fixation hole for the fixation mechanism.

The carrier 105 may have a shape that is at least partially defined by one or more supports 125. As illustrated in FIG. 1, the carrier 105 includes two supports 125 substantially parallel to and spaced from one another. The carrier 105 may further include at least one rib 130 extending from at least one of the supports 125 to provide additional structural support to the carrier 105 and prevent the carrier 105 from deforming due to external forces. The carrier 105 may further include at least one spacer 135 extending between two or more of the supports 125. The spacer 135 may maintain the distance between the supports 125 when external forces are applied. The ribs 130 and spacers 135 may be integrally formed with the supports 125 or manufactured separately and adhered to the supports 125 using an adhesive or fastener.

Figure 4A:
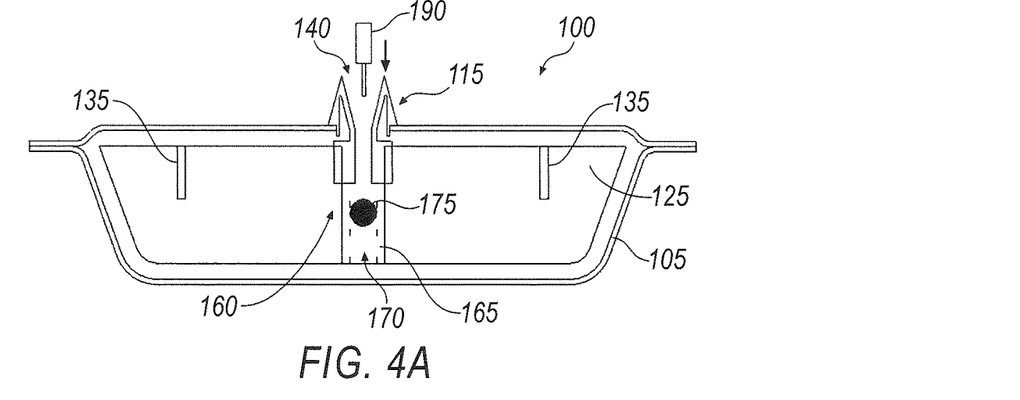
FIGS. 4A-4E illustrate an exemplary process of injecting the expandable material onto the carrier using a nozzle inserted into the fixation mechanism.

The fixation mechanism 115 may be disposed on at least one of the supports 125. In one exemplary approach, the fixation mechanism 115 may be integrally formed with the carrier 105 or formed separately and assembled onto the carrier 105. The fixation mechanism 115 may define an opening 140 for receiving a nozzle (see FIG. 4) configured to inject the expandable material into the opening 140 and onto the carrier 105. Accordingly, the fixation mechanism 115 may include a connector 145 that is configured to mate with the nozzle. The connector 145 may have a partially frusto-conical shape that defines the opening 140, although other configurations are possible. Moreover, the connector 145 may include various fittings for connecting to the nozzle, including a threaded fitting or a quick connect fitting, among others.

The expandable material (see FIG. 4) may include a two-component foam, such as a two-component polyurethane foam or a two-component epoxy-based foam. The expandable material may be introduced onto the carrier 105 in an unexpanded state. The expandable material may expand as part of a chemical reaction between the two components to fill, for instance, the space between the supports 125 of the carrier 105 or a portion of the cavity 110.

Figure 2:
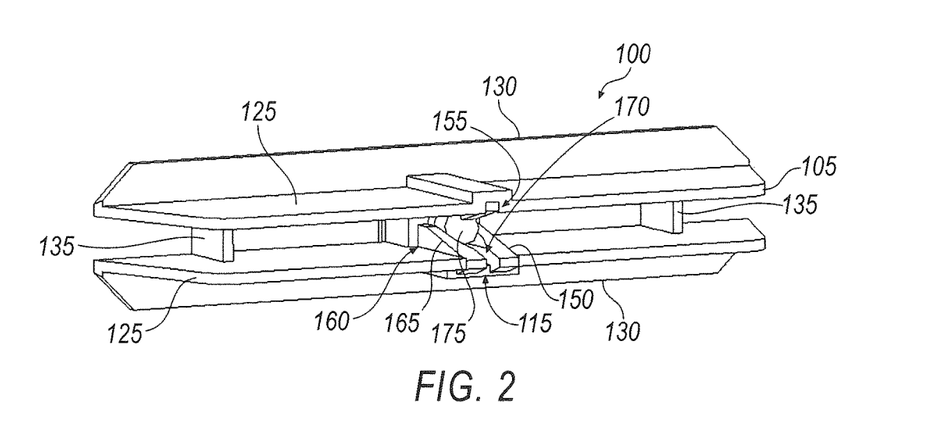
FIG. 2 illustrates a rear perspective view the exemplary carrier and fixation mechanism of FIG. 1.

The fixation mechanism 115 illustrated in FIGS. 1 and 2 is formed separately from the carrier 105 and mechanically or manually assembled to the carrier 105. Referring to FIG. 2, the fixation mechanism 115 may include at least one clip 150 for attaching to the carrier 105. The clip 150 may be integrally formed with the fixation mechanism 115 or connect to the fixation mechanism 115 using an adhesive or fastener. The supports 125 of the carrier 105 may define one or more recesses 155 that receive the clip 150 of the fixation mechanism 115. The clips 150 may be biased to engage the recesses 155 of the supports 125 and prevent movement of the fixation mechanism 115 relative to the supports 125. When clipped, therefore, the fixation mechanism 115 may stay in a generally fixed position relative to the carrier 105. To remove the fixation mechanism 115, the clips 150 may be disengaged from the recesses 155 in the supports 125 by applying a force that opposes the biasing force holding the clips 150 in the recesses 155.

The fixation mechanism 115 may further include an anti-return device 160 configured to prevent at least a portion of the expandable material from escaping through the opening 140 during expansion. In one exemplary approach, the anti-return device 160 includes a one-way valve. The anti-return device 160 may include a guide 165 that defines a channel 170 and a ball 175 disposed on the guide 165 and configured to roll along the channel 170. The guide 165 may be integrally formed with the connector 145 and clips 150 of the fixation mechanism 115. The ball 175 may be sized to substantially block the opening 140 in the fixation mechanism 115 and prevent at least a portion of the expandable material from escaping through the opening 140 during expansion.

Figure 3:
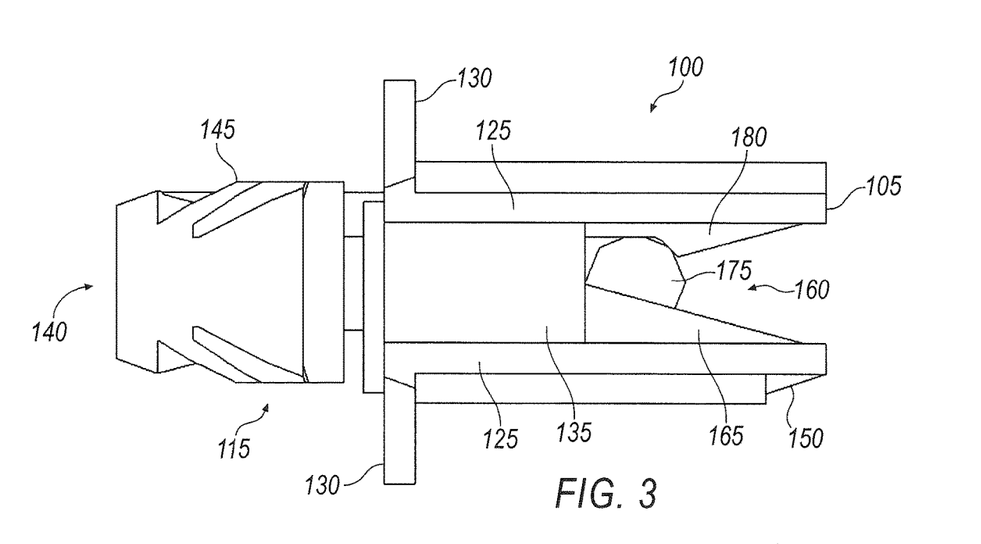
FIG. 3 illustrates a side view of the exemplary carrier and fixation mechanism of FIG. 1.

FIG. 3 illustrates a side view of the exemplary baffle or reinforcer 100 of FIG. 1. As shown, the guide 165 may be sloped so that the ball 175 rolls in a first direction away from the opening 140 when the expandable material is received in the fixation mechanism 115. Specifically, the force of the expandable material leaving the nozzle during injection causes the ball 175 to roll in the first direction along the channel 170. A stopper 180 may be used to limit movement of the ball 175 in the first direction. The stopper 180 may be integrally formed with one or more of the clips 150 and/or the guide 165. The expansion of the expandable material may cause the ball 175 to roll in a second direction toward the opening 140. Some of the expandable material may escape through the opening 140 during expansion, but the ball 175 substantially blocks the opening 140 to reduce the amount of expandable material that can escape through the opening 140 during expansion.

Figure 4B:
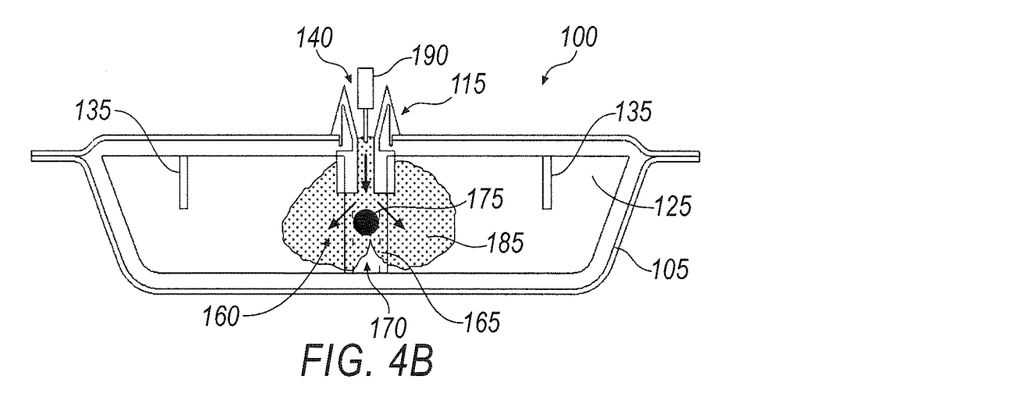
Figure 4C:
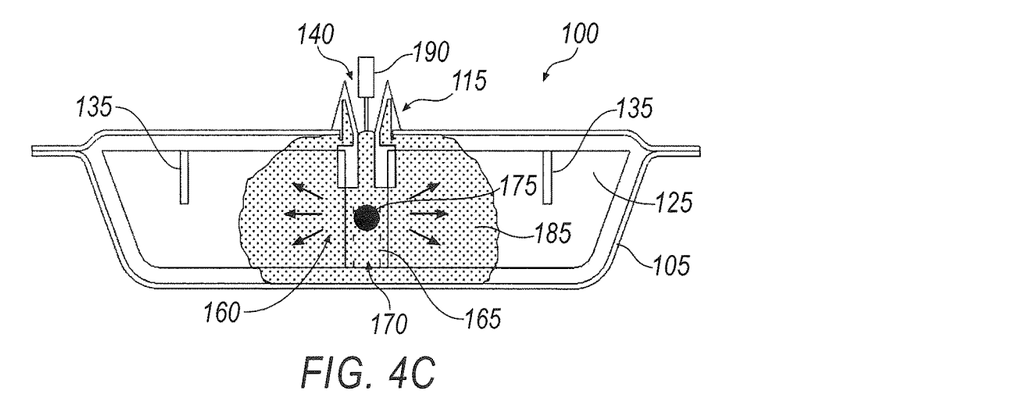
Figure 4D:
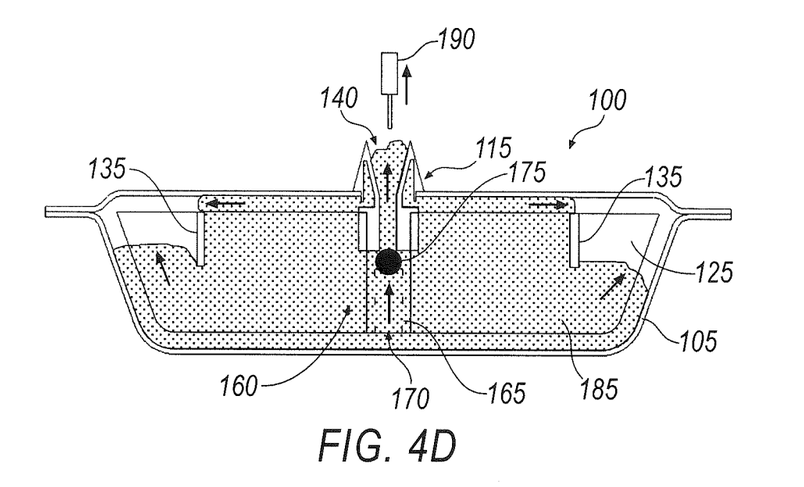
Figure 4E:
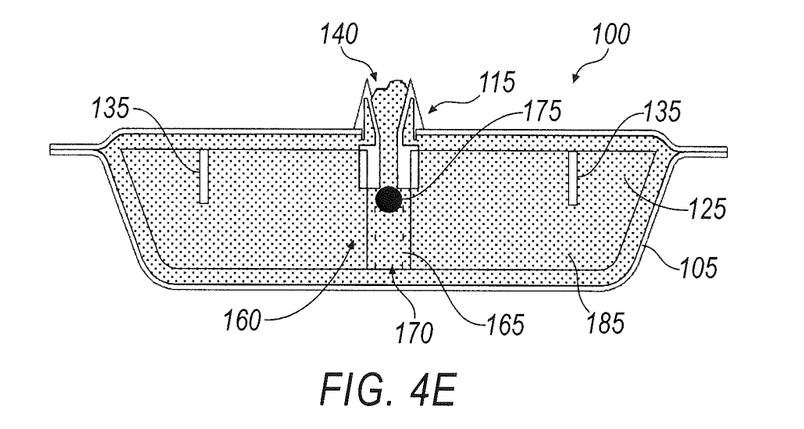

FIGS. 4A-4E illustrate an exemplary process for injecting the expandable material 185 onto the carrier 105. In FIG. 4A, a nozzle 190 is inserted into the opening 140 of the fixation mechanism 115. The nozzle 190 may be configured to mate with the connector 145 of the fixation mechanism 115. For example, the nozzle 190 and connector 145 may be threaded or have a quick-release fitting. When inserted, the nozzle 190 may inject the expandable material 185 onto the carrier 105 as illustrated in FIG. 4B. During injection, the force of the expandable material 185 exiting the nozzle 190 may push the ball 175 in the first direction away from the opening 140. The ball 175 may roll on the guide 165 as defined by the channel 170 until the ball 175 reaches the stopper 180. Gravity and the force of the expandable material 185 may bias the ball 175 against the stopper 180 during injection, allowing the expandable material 185 to flow into the opening 140 and onto the baffle or reinforcer 100. In FIG. 4C, the expandable material 185 begins to expand to fill the space between the supports 125 of the carrier 105. In FIG. 4D, the nozzle 190 is removed and the expansion force of the expandable material 185 pushes the ball 175 in the second direction toward the opening 140. The size of the ball 175 is sufficient to block the opening 140 and prevent at least part of the expandable material 185 from exiting the carrier 105. Once fully expanded, as illustrated in FIG. 4E, the ball 175 remains in place and the cavity 110 is sealed.

FIGS. 5A-5D illustrate exemplary baffle or reinforcer 100 configurations with the expandable material 185. In FIGS. 5A-5D, the baffle or reinforcer 100 is illustrated as being disposed within a cavity 110 and the expandable material 185 has been inserted and at least partially expanded.

Figures 5A, 5B:
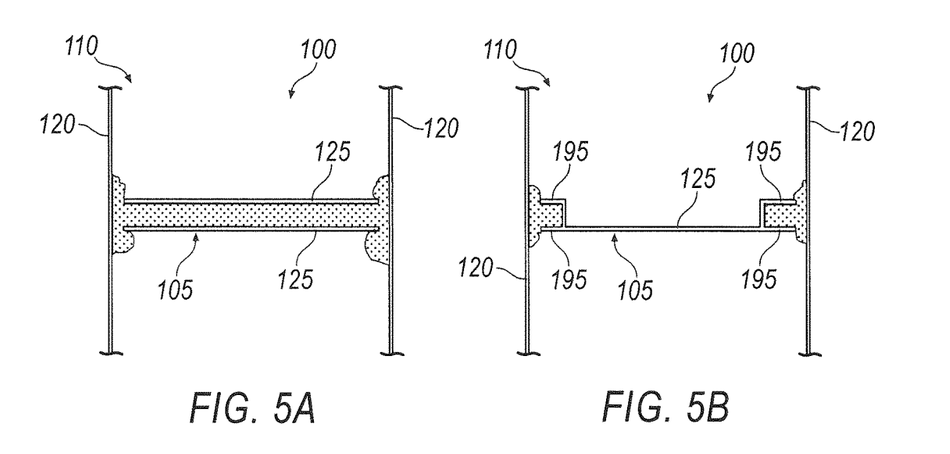
FIGS. 5A-5D illustrate exemplary cross-sectional baffle or reinforcer configurations with the expandable material disposed about various portions of the carrier and interior walls defining the cavity.

In FIG. 5A, the expandable material 185 is injected between two supports 125 of the carrier 105, as illustrated in FIGS. 4A-4E. Some of the expandable material 185 may expand beyond the confines of the support and contact the interior walls 120 defining the cavity 110. FIG. 5B illustrates the carrier 105 having a single-wall support instead of the double-wall support of FIG. 5A. In the single-wall support carrier 105 of FIG. 5C, however, there is no additional support to limit expansion of the expandable material 185. Therefore, the expandable material 185 may fill a greater portion of the cavity 110.

Figures 5C, 5D:
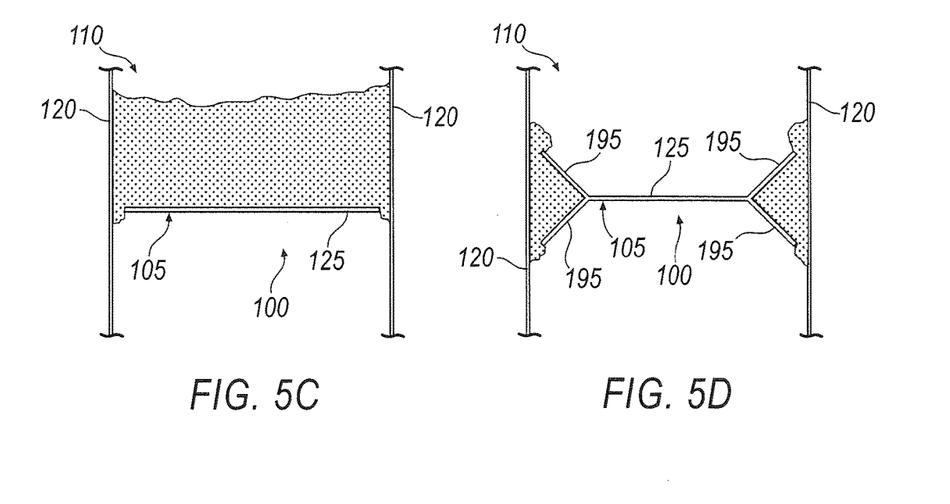

FIGS. 5B and 5D illustrate the carrier 105 having a single support with the expandable material 185 injected about a periphery of the carrier 105. The expandable material 185 may expand from the periphery of the carrier 105 to the interior walls 120 defining the cavity 110 to seal the cavity 110. For example, the carrier 105 may include tabs 195 disposed about the periphery of the carrier 105. The expandable material 185 may be injected between the tabs 195 using the fixation mechanism 115. FIG. 5B shows the tabs 195 being substantially parallel to one another while FIG. 5D shows the tabs 195 having a sideways V-shaped configuration. The tabs 195 may be integrally formed with the carrier 105.

Figure 6:
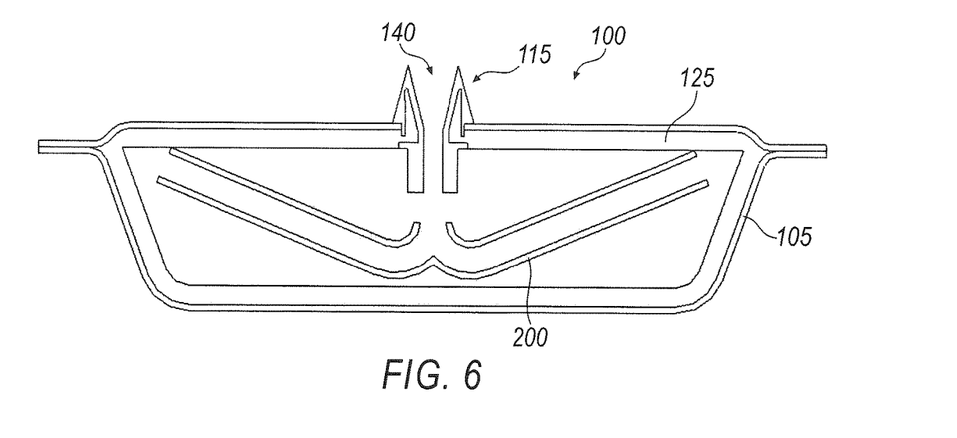
FIG. 6 illustrates a top view of an exemplary baffle or reinforcer having a carrier with channels that help direct the expandable material to critical areas of the carrier.

FIG. 6 illustrates a top view of an exemplary baffle or reinforcer 100 having channels 200 disposed on one or more of the supports 125. When the expandable material 185 is injected into the opening 140 and during expansion, the channel 200 may direct the expandable material 185 to critical areas of the carrier 105. As shown, the channels 200 may direct the expandable material 185 to an area of the carrier 105 near a weld seam. Moreover, the channel 200 itself may provide additional structural support to the carrier 105 like the ribs 130 illustrated in FIG. 1. The carrier 105 may include any number of channels 200.

Figure 7A:
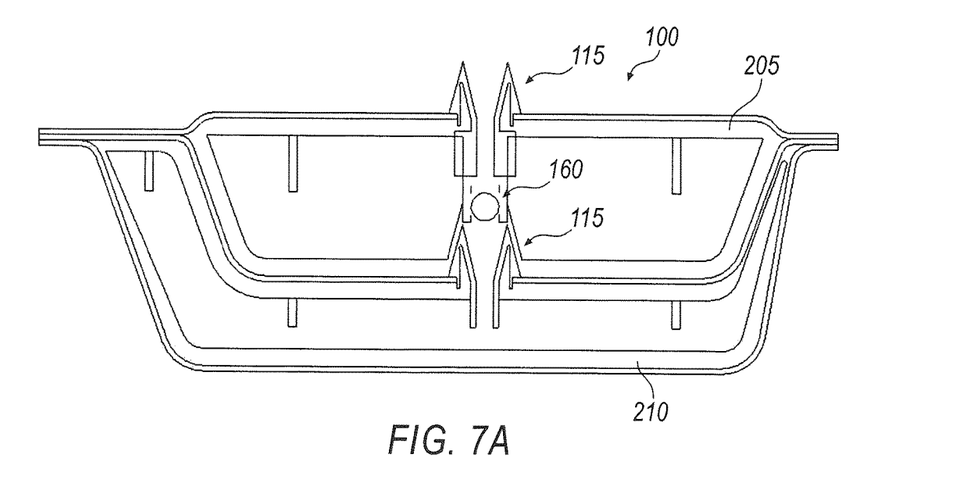
FIGS. 7A-7B illustrate a top view of exemplary inner carriers and an outer carrier with aligned fixation mechanisms.
Figure 7B:
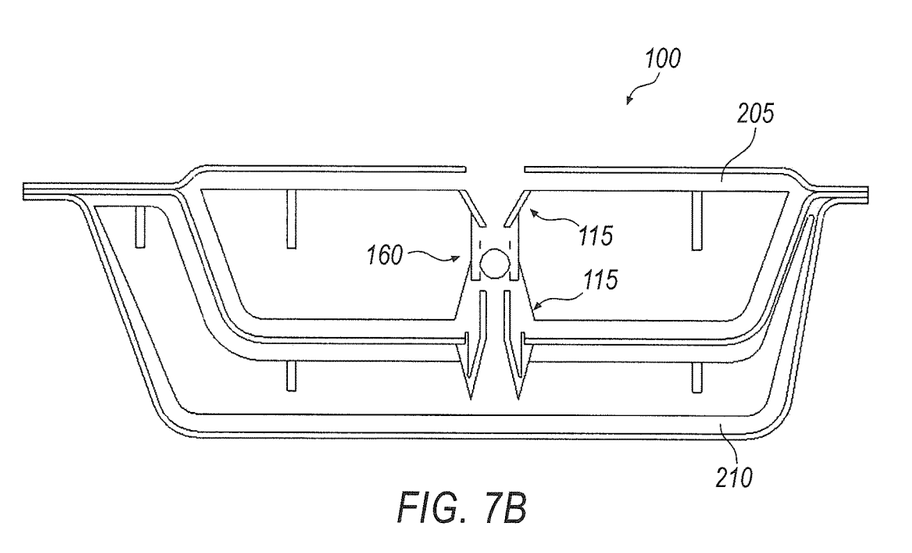

FIGS. 7A-7B illustrate a pair of exemplary baffles or reinforcers 100 with aligned fixation mechanisms 115 so that, for example, a single nozzle 190 may be used to inject the expandable material 185 onto two baffles or reinforcers 100. As illustrated, an inner carrier 205 may be connected to an outer carrier 210 using, for example, the fixation mechanism 115 of the outer carrier 210. The inner carrier 205 and outer carrier 210 may be manufactured separately and connected by, for instance, the fixation mechanism 115 of the outer carrier 210. Specifically, the inner carrier 205 may define a hole opposite the fixation mechanism 115 of the inner carrier 205. The fixation mechanism 115 of the outer carrier 210 may extend through the hole such that the fixation mechanisms 115 of the inner carrier 205 and outer carrier 210 are substantially aligned. This way, the expandable material 185 may be introduced into the inner carrier 205 and outer carrier 210 using a single nozzle 190. In this exemplary approach, the fixation mechanism 115 of the outer carrier 210 need not have a separate anti-return device 160 since the anti-return device 160 of the inner carrier 205 may be sufficient to prevent the majority of the expandable material 185 from escaping through the opening 140.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A baffle or reinforcer comprising:
a carrier; and
a fixation mechanism disposed on the carrier wherein the carrier and the fixation mechanism together form an integrated baffle or reinforcer that is insertable into a cavity, and the fixation mechanism is configured to at least partially support the carrier in the cavity;
wherein the fixation mechanism defines an opening for receiving an expandable material, the fixation mechanism having an anti-return device configured to prevent at least a portion of the expandable material from escaping through the opening during expansion;
wherein the carrier includes two elongated supports spaced from one another, and wherein the fixation mechanism is disposed between the two elongated supports, and wherein the two elongated supports are substantially parallel to one another, and wherein the carrier includes at least one spacer extending between the two supports, and wherein the at least one spacer is configured to maintain a distance between the supports when external forces are applied.

2. A baffle or reinforcer comprising:
a carrier; and
a fixation mechanism disposed on the carrier wherein the carrier and the fixation mechanism together form an integrated baffle or reinforcer that is insertable into a cavity, and the fixation mechanism is configured to at least partially support the carrier in the cavity;
wherein the fixation mechanism defines an opening for receiving an expandable material, the fixation mechanism having an anti-return device configured to prevent at least a portion of the expandable material from escaping through the opening during expansion;
wherein the carrier includes two supports spaced from one another, and wherein the fixation mechanism is disposed between the two supports, and wherein the supports are substantially parallel to one another and the carrier includes at least one rib extending from at least one of the two supports, and wherein the carrier includes at least one spacer extending between the two supports, and wherein the at least one spacer is configured to maintain a distance between the supports when external forces are applied;
wherein the expandable material includes at least one of a two-component polyurethane foam and a two-component epoxy-based foam;
wherein the anti-return device includes a guide and a ball disposed on the guide.

3. A baffle or reinforcer as set forth in claim 2, wherein the guide is sloped, and the ball is configured to roll on the guide in a first direction when the expandable material is received in the fixation mechanism and roll on the guide in a second direction when the expandable material expands.

4. A baffle or reinforcer as set forth in claim 2, wherein the anti-return device includes a stopper configured to limit movement of the ball in the first direction.

5. A baffle or reinforcer as set forth in claim 2, wherein the ball is sized to substantially fill the opening in the fixation mechanism and prevent at least a portion of the expandable material from escaping through the opening during expansion.

6. A baffle or reinforcer as set forth in claim 1, wherein the anti-return device includes a valve.

7. A baffle or reinforcer as set forth in claim 1, wherein the fixation mechanism includes at least one clip for attaching to the carrier.

8. A baffle or reinforcer as set forth in claim 1, wherein the carrier is a rigid, substantially flat carrier.

9. A baffle or reinforcer as set forth in claim 1, wherein the spacer is integrally formed with the at least two supports.

10. A baffle or reinforcer as set forth in claim 1, wherein the fixation mechanism has a connector with a substantially frusto-conical configuration defining the opening.

11. A baffle or reinforcer as set forth in claim 1, wherein the fixation mechanism includes a first fixation mechanism as part of an inner carrier and a second fixation mechanism as part of an outer carrier, wherein said first fixation mechanism and said second fixation mechanism are substantially aligned with one another.

12. A baffle or reinforcer as set forth in claim 1, wherein the cavity is located within an automotive and/or aerospace vehicle.

13. A baffle or reinforcer as set forth in claim 1, wherein the baffle or reinforcer, in combination with the expandable material, is configured to provide acoustic dampening, sealing, and/or structural reinforcement.

14. A baffle or reinforcer as set forth in claim 1, wherein the expandable material includes at least one of a two-component polyurethane foam and a two-component epoxy-based foam.

15. A baffle or reinforcer as set forth in claim 1, wherein the anti-return device includes a guide and a ball disposed on the guide.

16. A baffle or reinforcer as set forth in claim 15, wherein the guide is sloped, and the ball is configured to roll on the guide in a first direction when the expandable material is received in the fixation mechanism and roll on the guide in a second direction when the expandable material expands.

\* \* \* \* \*